United States Patent [19]

Cox et al.

[11] Patent Number: 4,609,873
[45] Date of Patent: Sep. 2, 1986

[54] DIELECTRIC WELL LOGGING SYSTEM WITH AT LEAST THREE TRANSMITTER COILS AND AT LEAST TWO RECEIVER COILS FOR DETERMINING RESISTIVITY AND DIELECTRIC CONSTANT OF A SUBSURFACE FORMATION ADJACENT A FLUID INVADED ZONE OF THE FORMATION

[75] Inventors: Percy T. Cox; Richard A. Meador, both of Houston; Roland G. Riedesel, Jr., Austin; Kerry D. Savage, Houston, all of Tex.

[73] Assignee: Texaco Inc., White Plains, N.Y.

[21] Appl. No.: 109,691

[22] Filed: Jan. 4, 1980

[51] Int. Cl.[4] .................. G01V 3/30; G01V 3/38; G08C 15/06

[52] U.S. Cl. ..................... 324/338; 324/341; 340/854; 340/858

[58] Field of Search ............... 324/323, 334, 338–341, 324/339, 371; 340/853, 854, 856–858, 861

[56] References Cited

U.S. PATENT DOCUMENTS

| | | | |
|---|---|---|---|
| 2,220,070 | 11/1940 | Aiken | 324/339 |
| 2,790,138 | 4/1957 | Poupon | 324/339 |
| 2,986,693 | 5/1961 | Alder | 324/371 |
| 3,052,835 | 9/1962 | Dunlap et al. | 324/339 X |
| 3,086,168 | 4/1963 | Buckner | 324/339 |
| 3,259,837 | 7/1966 | Oshry | 324/339 |
| 3,551,797 | 12/1970 | Gouilloud et al. | 324/338 |
| 3,849,721 | 11/1974 | Calvert | 324/338 |
| 4,087,781 | 5/1978 | Grossi et al. | 340/854 |
| 4,107,597 | 8/1978 | Meador et al. | 324/339 X |
| 4,107,598 | 8/1978 | Meador et al. | 324/341 |
| 4,130,793 | 12/1978 | Bridges et al. | 324/341 |
| 4,185,238 | 1/1980 | Huchital et al. | 324/338 |
| 4,189,705 | 2/1980 | Pitts | 340/854 X |
| 4,278,941 | 7/1981 | Freedman | 324/339 X |

FOREIGN PATENT DOCUMENTS 374565 6/1973 U.S.S.R. ............... 324/338

Primary Examiner—Gerard R. Strecker
Attorney, Agent, or Firm—Robert A. Kulason; Ronald G. Gillespie

[57] ABSTRACT

A dielectric well logging system is provided to determine dielectric constant and resistivity in formations invaded by water to determine oil and water saturations of the formations. Plural transmitters are activated in a time division multiplex manner and sensed by receiver coils. The amplitude ratio and phase difference between the signals sensed by the receiver coils are then used to determine dielectric constant and resistivity which may then be used to determine invasion characteristics.

22 Claims, 6 Drawing Figures

DIELECTRIC WELL LOGGING SYSTEM WITH AT LEAST THREE TRANSMITTER COILS AND AT LEAST TWO RECEIVER COILS FOR DETERMINING RESISTIVITY AND DIELECTRIC CONSTANT OF A SUBSURFACE FORMATION ADJACENT A FLUID INVADED ZONE OF THE FORMATION

BACKGROUND OF INVENTION

1. Field of Invention

The present invention relates to dielectric well logging.

2. Description of Prior Art

Prior electromagetic wave logging tools operated at typically from twenty to one hundred megahertz and obtained a measurement of amplitude ratio and phase difference from two receiver coils spaced at different spacings in a sonde from a transmitter coil. These logging tools were usually adequate in determining dielectric constant and resistivity of the formation where drilling fluid invasion has been minimal, so that formation oil and water saturation of the formation could be determined.

When these tools were operated under conditions of moderate to deep invasion, determination of formation dielectric constant and resistivity became very difficult. The presence of the invaded zone, with its effects on electromagnetic fields, caused three more unknown quantities: resistivity and dielectric constant of the invaded zone, and the diameter of invasion. Thus, five unknown quantities were present when these three additional unknown quantities were included with the true formations resistivity and dielectric constant, so that the prior art logging systems did not usually provide adequate data for analysis.

SUMMARY OF INVENTION

Briefly, the present invention provides a new and improved dielectric well logging apparatus for determining resistivity and dielectric constant for a fluid invaded subsurface formation adjacent a well borehole. At least three transmitter coils spaced from each other and housed in a sonde which moves through the well borehole emit radio frequency energy waves in response to control signals. At least two receiver coils spaced from each other and from the transmitter coils in the sonde receive the energy after passage from the transmitter coils through the formation and borehole. Each of the transmitter coils forms a transmitter-receiver pair with the receiver coils due to their distinct spacing as contrasted to the other transmitter coils. A receiver circuit forms signals or data representing the energy received, and a processing circuit forms a measure of the phase differences and amplitude ratios of the signals from the receiver circuit.

Control circuitry is also provided so that the receiver circuit signals are separated into signal groups or channels representing energy transmitted and received between each of the different ones of the transmitter coil-receiver coil pairs. The control circuitry thus separates the data from the receiver circuit into groups and based on the transmitter-receiver spacing for each pair and the amplitude ratios and phase differences between the readings for different pairs, the different resistivity and dielectric constant values indicated by the various groups of readings may be determined, which provide an indication of fluid invasion of the formation. Circuitry is also provided with the present invention to isolate circuitry of the transmitter coils from circuitry of the receiver coils in the sonde.

DESCRIPTION OF PREFERRED EMBODIMENT

Figure 1:
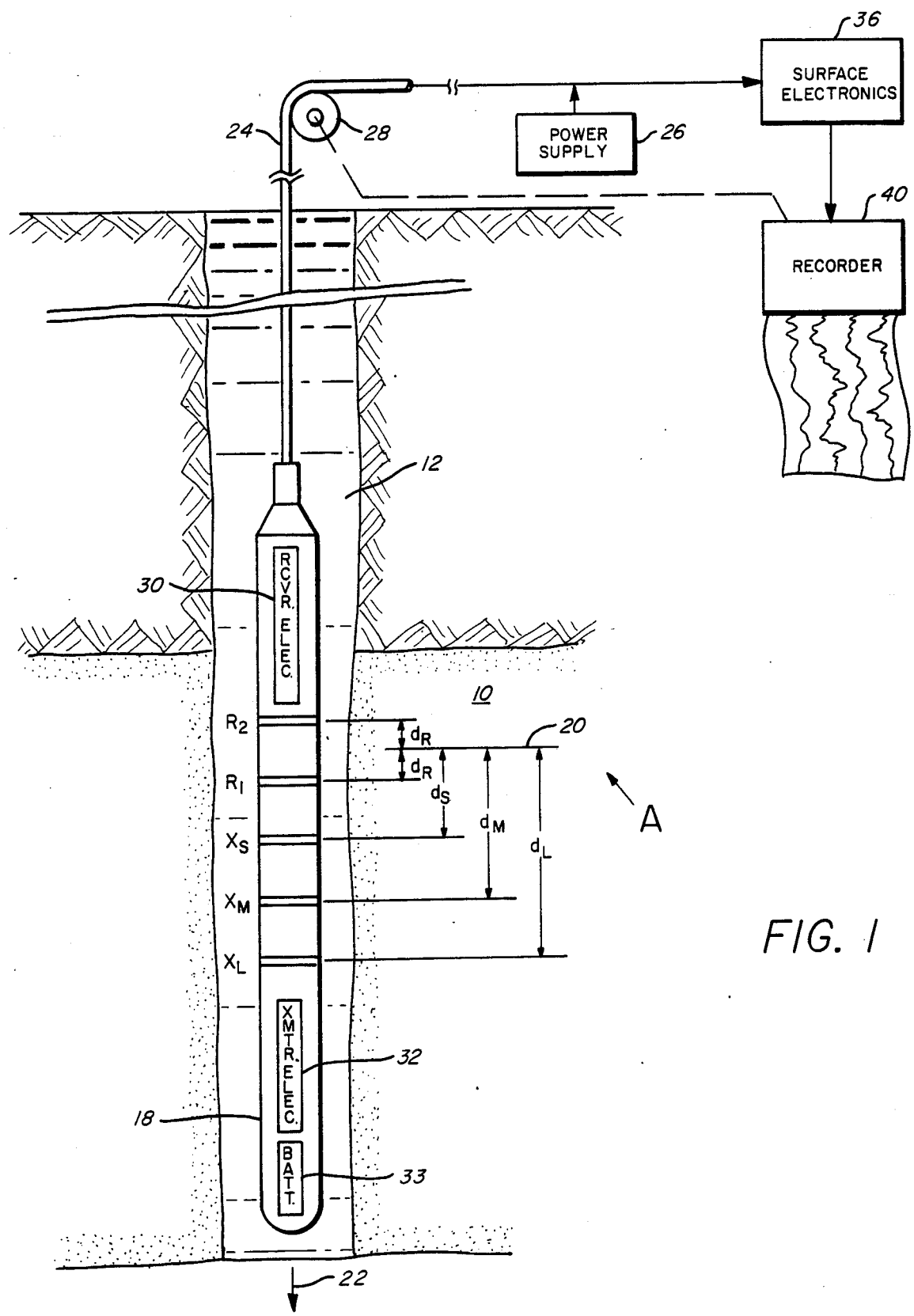
FIG. 1 is a schematic diagram, partly in cross-section, of a well logging apparatus of the present invention in a well borehole adjacent subsurface formations.

In the drawings, the letter A designates generally a dielectric well logging apparatus according to the present invention for obtaining measurements of the resistivity and dielectric constant of subsurface formations 10 adjacent a well borehole 12. The apparatus A includes at least three transmitter coils $X_L$, $X_M$ and $X_S$ which are mounted at spaced distances from each other in a sonde 18, made from a suitable material. The transmitter coils $X_L$, $X_M$ and $X_S$ are also spaced distances $d_L$, $d_M$ and $d_S$, respectively, from a reference position plane or location in the sonde 18 indicated by a line 20.

The apparatus includes at least two receiver coils $R_1$ and $R_2$ mounted in the sonde 18. The receiver coils $R_1$ and $R_2$ are each spaced a distance $d_R$ on opposite sides of the reference position plane indicated by line 20 and are thus spaced from each other and from each of the transmitter coils $X_l$, $X_M$ and $X_S$ a distinct distance so that transmitter receiver coil pairs are present in the sonde 18, as defined in Chart 1 below, with example spacings given.

CHART 1

| TRANSMITTER-RECEIVER COIL PAIRS | | | |
|---|---|---|---|
| Pair | Transmitter | Receiver | Spacing |
| 1 | $X_L$ | $R_2$ | $d_L + d_R$ (44") |
|  | $X_L$ | $R_1$ | $d_L - d_R$ (32") |
|  | $X_M$ | $R_2$ | $d_M + d_R$ (32") |
| 2 | $X_M$ | $R_1$ | $d_M - d_R$ (20") |
|  | $X_S$ | $R_2$ | $d_S + d_R$ (20") |
| 3 | $X_S$ | $R_1$ | $d_S - d_R$ (14") |

It should be understood that the example spacings are only by way of example and that other suitable spacings could equally as well be used. It should also be understood that the receiver coils $R_1$ and $R_2$ need not be equally spaced from the reference plane in the sonde 18.

The sonde 18 is moved through the borehole 12 along its longitudinal axis as indicated by an arrow 22 in response to movement of a wire line or cable 24.

Figure 3:
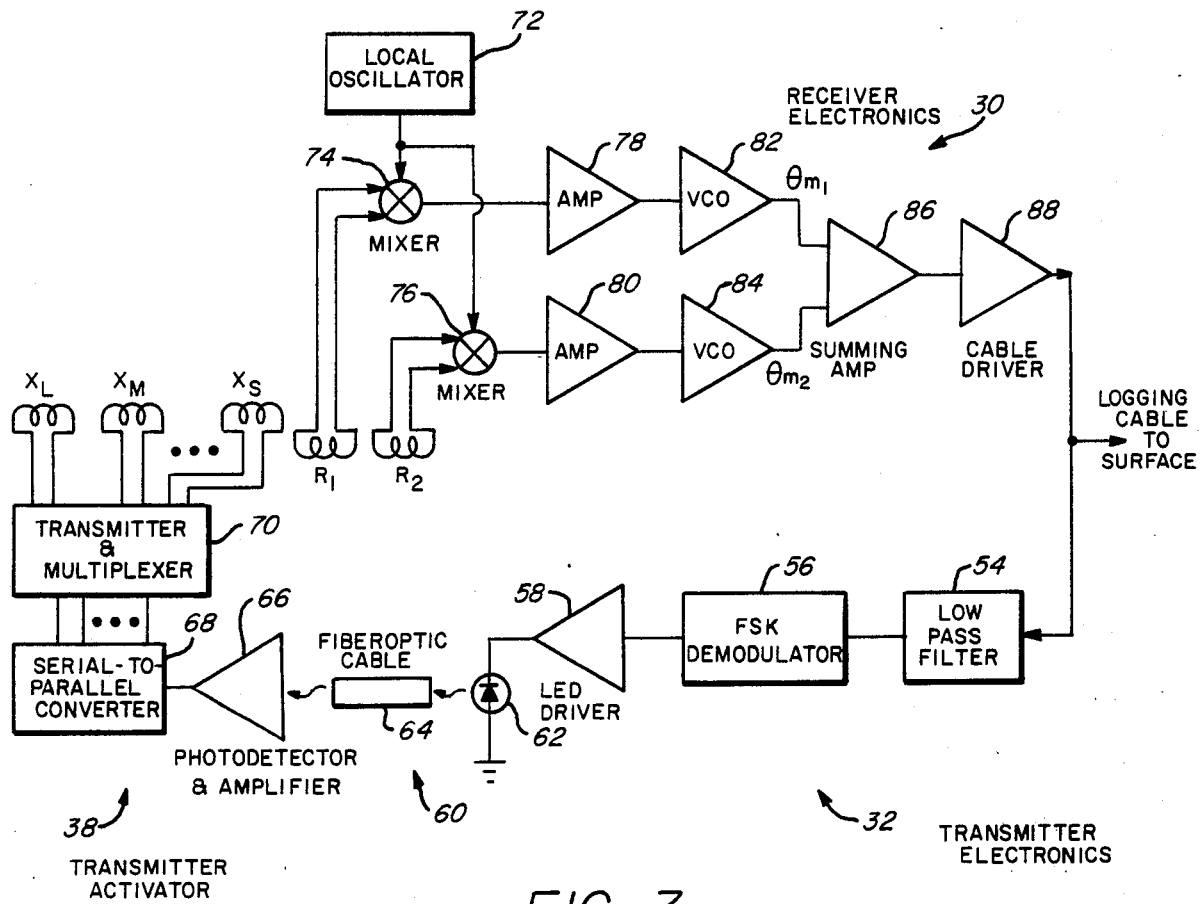
FIG. 3 is a schematic electrical circuit diagram of subsurface electronics in the apparatus of FIG. 1.

The receiver coils $R_1$ and $R_2$ receive operating electrical power from a power supply 26 at a surface location adjacent the well borehole 12 by means of the wire line 24 which passes over a sheave wheel 28. Operating electrical power from the power supply 26 is also provided through suitable conventional connections to a receiver electronic circuit 30 (FIGS. 1 and 3) from the wire line 24.

The transmitter coils $X_L$, $X_M$ and $X_S$ are energized to emit radio frequency electromagnetic waves, typically in the range of from twenty to one hundred megahertz, by a transmitter electronic circuit 32. Operating electrical power for the transmitter electronic circuit 32 is preferably provided from suitable electrical batteries 33 (FIG. 1) in the sonde 18 rather than by conductors from power supply 26 by the wireline 24 in order to reduce the likelihood of radio frequency interference, as will be set forth.

The coils $X_L$, $X_M$, and $X_S$ each emit radio frequency waves of a common frequency so that charts of dielectric constant and resistivity obtained from tests run experimentally in test boreholes may be used by an analyst. However, with each of the transmitter coils on a common frequency, receiver coils $R_1$ and $R_2$ cannot respond and distinguish which transmitter coil is responsible for amplitude and phase readings obtained.

Figure 2:
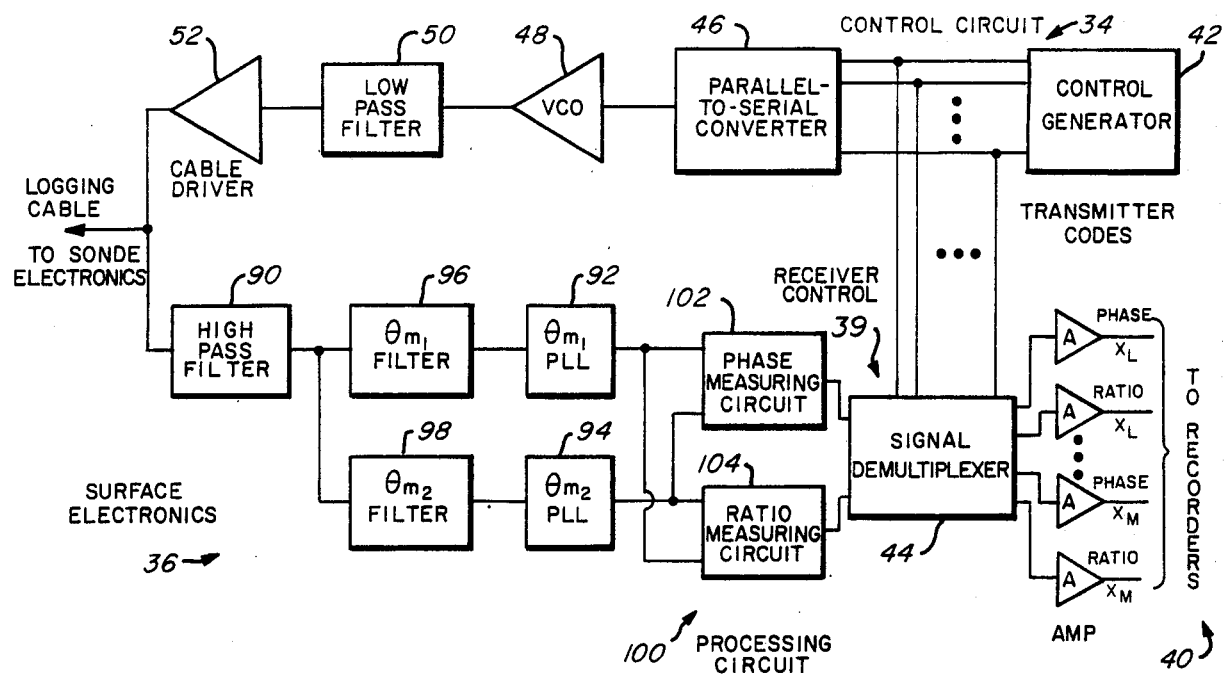
FIG. 2 is a schematic electrical circuit diagram of surface electronics in the apparatus of FIG. 1.

Accordingly, with the present invention, a control circuit 34 (FIG. 2) is provided in a surface electronics circuit 36 which controls the activation of the transmitters $X_L$, $X_M$ and $X_S$ and any other transmitter coils in the sonde 18 through a transmitter activation circuit 38 (FIG. 3) in the transmitter electronics circuit 32 in the sonde 18.

The radio frequency waves from the transmitters $X_L$, $X_M$ and $X_S$ travel through the borehole 12 and formation 10 and are received by the receivers $R_1$ and $R_2$. The receivers $R_1$ and $R_2$ are electrically connected to the receiver electronics circuit 30 which senses the amplitude and phase of the signals from the receivers $R_1$ and $R_2$. The responses obtained in receiver electronics circuit 30 in the sonde 18 are transmitted via the wireline 24 through a receiver control circuit 39 of surface electronics circuit 36 which separates, in conjunction with control circuit 34, the responses of receiver coils $R_1$ and $R_2$ to form output signals of amplitude ratio and phase difference in separate channels or data streams for each of the transmitter-receiver pairs in the sonde 18.

The measurements of amplitude ratio and phase difference from the receiver control circuit 39 are transferred to a suitable recorder or other display device 40 electrically connected to the surface electronics unit 36 to provide an output indication of the processed results from the electronics unit 36 for use by an analyst or other person. The recorder 40 is further connected to the sheave wheel 28 so that the results may be plotted as a function of depth in the borehole 12.

Considering now the system control 34 in detail, a command control generator 42 generates time division multiplexed digital command codes which are furnished over wireline 24 to determine the operating sequence and time duration of operation for each of the transmitter coils $X_L$, $X_M$ and $X_S$. The command codes from generator 42 are also provided to a time division signal demultiplexer 44 of the receiver control circuit 39 to ensure that signals from the receiver electronics circuit 30 in the sonde 18 are provided to the recorder 40 in proper synchronization according to the transmitter-receiver pair for recording.

The parallel digital time division multiplexed command codes from the control generator 42 are converted into a serial command stream by a parallel-to-serial converter 46 of the control circuit 30 and applied to a voltage controlled oscillator 48. The frequency of the voltage controlled oscillator 48 is frequency shift keyed by the serial command stream with digital ones and zeros of the digital command codes between suitable frequencies, such as 2,225 hertz and 2,025 hertz, respectively. The frequency shift keyed serial command code data is then provided through a low pass filter 50 to a cable driver 52 which transmits the command signals via the wireline 24 to the transmitter electronics circuit 32 in the downhole sonde 18.

In the sonde 18 (FIG. 3), the coded command signals are received and passed through a low pass filter 54 to a frequency shift key demodulator 56. The frequency shift key demodulator 56 converts the signals to corresponding ones and zeros in a serial command stream which are furnished to a light-emitting diode driver 58 of an optical coupling network 60. The driver 58 drives a light-emitting diode 62 which converts the serially coded electrical command pulses into light pulses which are furnished through a fiberoptic cable 64 to a photodetector/amplifier 66. It is to be noted that the command electrical codes furnished from the control circuit 30 are optically coupled to the transmitter activator 38 through the optical network 60, which thus eliminates wires which would otherwise be required between the transmitter and receiver coils in the circuitry in the sonde 18, so that electrical isolation between the transmitter and receiver coils in the sonde 18 is provided. Likewise, as has been set forth, the transmitter electronics circuit 32 is powered by suitable batteries 33, such as nickel cadmium batteries, to prevent any requirement for power leads between the transmitter coils and receiver coils, since it has been found that any wires in the sonde 18 between transmitter and receiver coils cause unwanted coupling between the coils. Thus, without the optical coupling network 60 and batteries 33 in the sonde 18 such coupling has been found to be extremely difficult to remove.

The photodetector 66 converts the light pulses again into electrical signals which are then applied to a serial-to-parallel transmitter converter 68 of the transmitter activator circuit 38. The converter 68 reproduces the original surface command digital signals and activates the transmitter coils $X_L$, $X_M$ and $X_S$ by means of a transmitter circuit 70 in a sequence specified by the control generator 42.

The transmitter circuit 70 includes a radio frequency oscillator of a suitable output frequency, such as thirty megahertz, followed by a buffer stage, the output of which is switched to one of three driver/output stages by means of a time division multiplexer to drive the transmitter coils in response to the command codes in the sequence specified by the control circuit 34. The transmitter coils preferably are in the form of three turns of suitable gauge wire wound in a single layer on a suitable diameter form, with electrostatic shielding provided.

The receiver coils $R_1$ and $R_2$ receive radio frequency energy emitted from the transmitter coils $X_L$, $X_M$ and $X_S$ after passage through the formation 10 and borehole and form electrical signals in response to receipt of such energy. The received signals from the coils $R_1$ and $R_2$ are mixed with a local reference frequency signal from a local oscillator 72 in the receiver electronics 30 by means of mixers 74 and 76, respectively. The mixers 74 and 76 produce intermediate frequency product signals of approximately two kilohertz, containing amplitude and phase information. The intermediate frequency product signals from the mixers 74 and 76 are applied through amplifiers 78 and 80 respectively, to voltage controlled oscillators 82 and 84 which have carrier frequencies of, for example, twenty-five and seventy-five kilohertz, respectively. The intermediate frequency signals from the mixers 74 and 76 thus appear as frequency modulations of the carrier frequencies and the modulated carrier signals are provided to and summed in a summing amplifier 86. The summed modulated carrier frequencies are then sent to the surface electronics circuit 36 over the wireline 24 by means of a cable driver 88.

In the surface electronics 36 (FIG. 2), the incoming signals from the sonde 18 over the wireline 24 are filtered in a high-pass filter 90 and applied to phased locked loop detectors 92 and 94 through loop filters 96 and 98, respectively. The detectors 92 and 94 demodulate the frequency modulated carrier signals and thus form replicas of the intermediate frequency signals formed in the mixers 74 and 76 of the receiver electronics 30.

The intermediate frequency signals from the detectors 92 and 94 are furnished to a processing circuit 100 so that a phase measuring circuit 102 may form a measure of the phase difference between the output signals from the detectors 92 and 94. The intermediate frequency signals from the detectors 92 and 94 are also furnished to a ratio measuring circuit 104 of the processing circuit 100 which forms a measure of the amplitude ratio of the signals from the receiver electronics 30.

The amplitude ratio and phase difference measurements obtained in the processing circuit 100 may be either in analog or digital form and are furnished to the signal demultiplexer 44 of the receiver control 39. As has been set forth, the demultiplexer 44 is also driven by the control generator 42 in a synchronized manner with the generation of command codes specifying which of the transmitter-receiver pairs in the sonde 18 are to be active at a particular time. Accordingly, the signal demultiplexer 44 separates the signals from the receiver circuit 30 into channels or streams according to the particular one of the transmitter-receiver pairs which generated such signals. In this manner, the identity of the transmitter-receiver pair is maintained. With three transmitter coils in the sonde 18 and two receiver coils, six output signals are provided to the recorder 42, three measures of amplitude ratio and three measures of phase difference. Of course, additional transmitter and receiver coils may be provided in the sonde 18 and controlled by control circuit 54 for obtaining a greater number of measurements for processing, if desired.

With the control circuit 34 of the present invention, the apparatus A may be operated in a number of operating modes with substantial flexibility. The control generator 42 may be controlled either manually or electronically so that at least four operating modes may be achieved: transmitter coils inactive (power down mode); any single transmitter coil on continuously; sequential switching between any two of the transmitter coils in the sonde 18; and sequential switching between all three of the transmitter coils in the sonde 18. If more than three transmitter coils are provided, control circuit 34 affords even greater flexibility. Thus, the control circuit 34 provides sufficient flexibility to add features such as remote control of the power output of each transmitter coils independently should it become desirable or necessary to operate in this manner.

Figure 4:
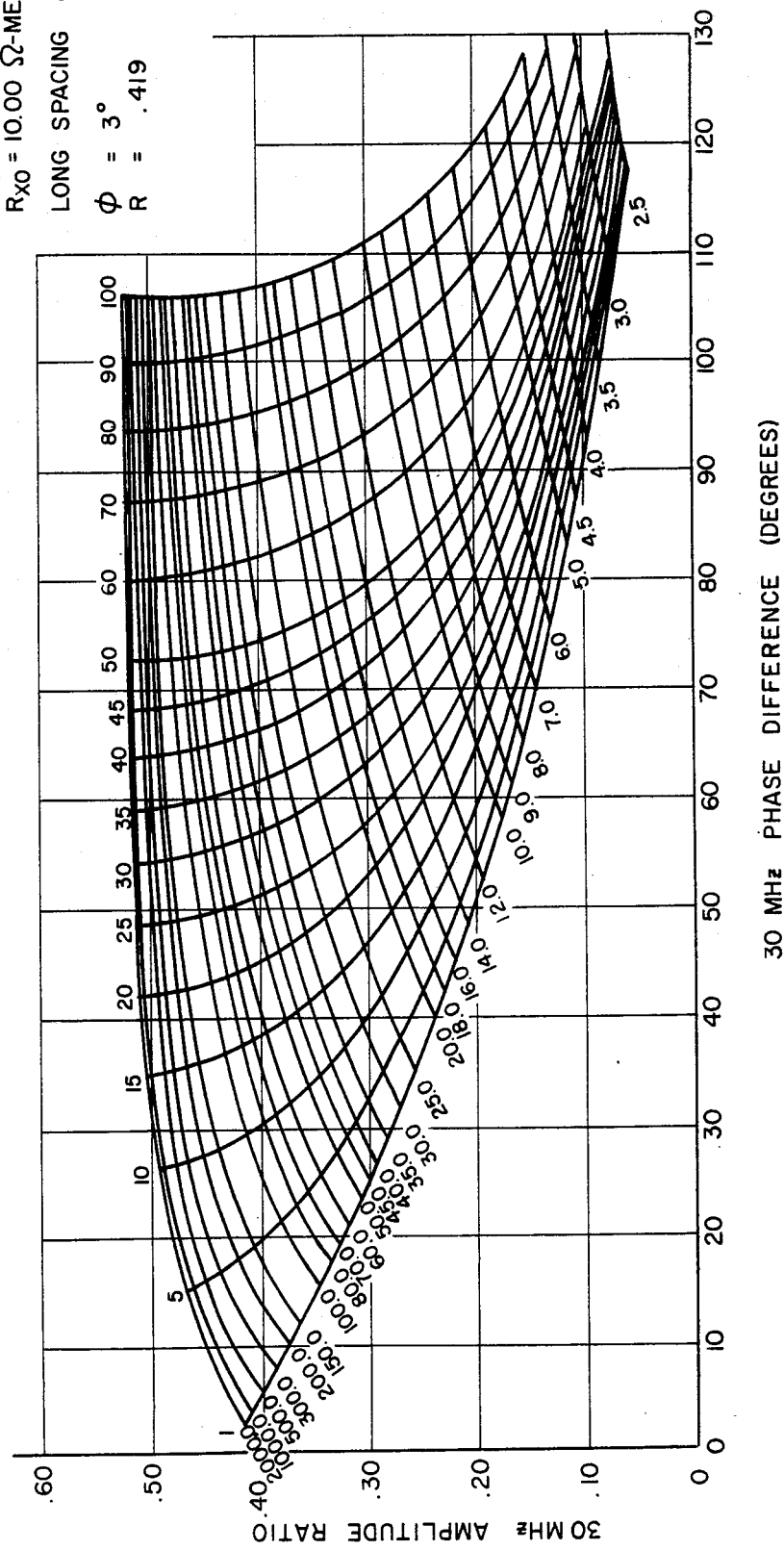
FIGS. 4, 5, and 6 are plots of resistivity and dielectric constant as functions of amplitude ratio and phase difference for example transmitter-receiver pair spacings in the apparatus of FIG. 1.
Figure 5:
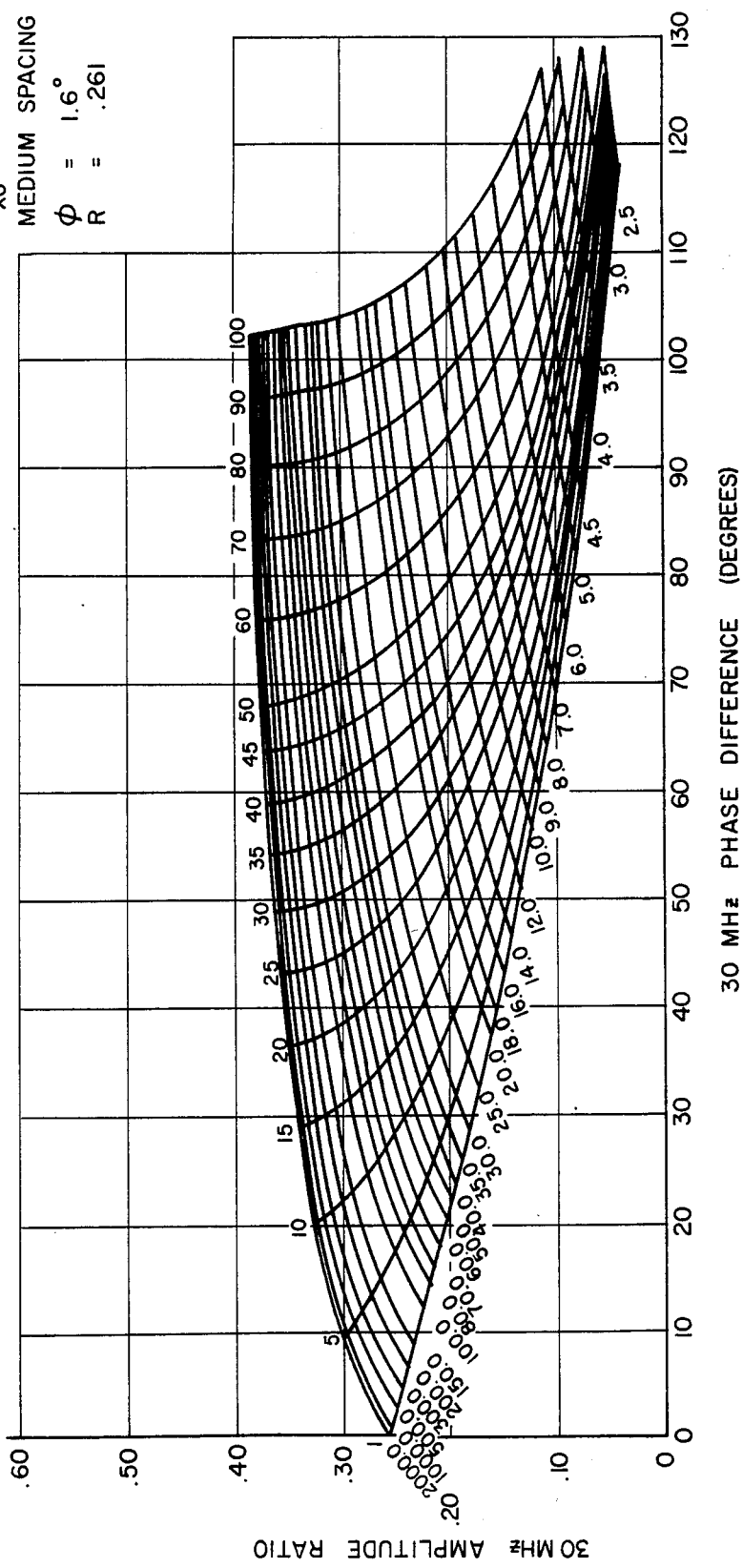
Figure 6:
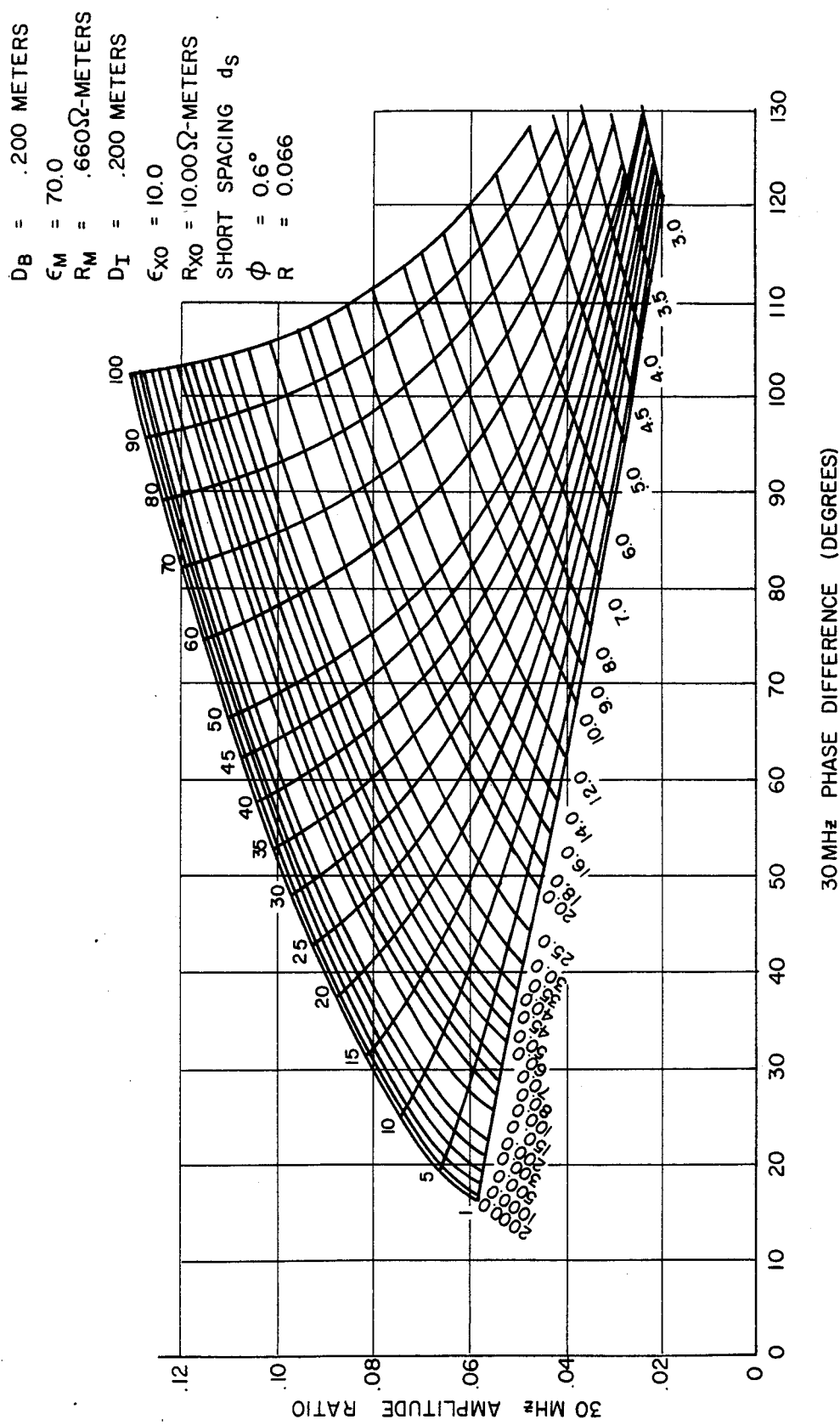

Turning now to FIGS. 4 through 6, amplitude ratio-phase difference versus resistivity-dielectric constant cross-plots are set forth for example spacings of the transmitter coils from the reference position obtained theoretically. In FIG. 4, the resistivity-dielectric constant cross-plot for the transmitter coil $X_L$ is set forth with the following theoretical air values:

Phase = 3.0°,
Ratio = 0.419

In FIG. 5, the resistivity-dielectric constant cross-plot for the transmitter coil $X_M$ is set forth with the following theoretical air values:

Phase = 1.6°,
Ratio = 0.261.

In FIG. 6, the resistivity-dielectric constant cross-plot is set forth (attention is directed to the change of scale of the amplitude ratio between FIG. 6 and FIGS. 4 and 5) for the transmitter coil $X_S$ with the following theoretical air values:

Phase = 0.6°,
Ratio = 0.066

The cross-plots of FIGS. 4 through 6 may then be used to determine formation dielectric constant and resistivity based on the phase difference and amplitude ratio measurements from the processing circuit 100 according to the particular transmitter-receiver pair.

The formation dielectric constant and resistivity measures so obtained may then be used to determine invasion characteristics based on an analysis of the dielectric constant and resistivity measurements obtained for the three transmitter coils. Chart 2 below sets forth the type of results which are obtained for fresh water invasion in an oil-saturated zone:

CHART 2

| Transmitter | Measurements |
| --- | --- |
| $X_S$ Short-spaced transmitter | High resistivity, high dielectric constant |
| $X_M$ Medium-spaced transmitter | High resistivity, lower dielectric constant |
| $X_L$ Long-spaced transmitter | High resistivity, lowest dielectric constant. |

Conversely, for salt water invasion of an oil-saturated zone, Chart 3 gives an example of the relative measurements:

CHART 3

| | |
| --- | --- |
| $X_S$ Short-spaced transmitter | Low resistivity, high dielectric constant |
| $X_M$ Medium-spaced transmitter | Higher resistivity, lower dielectric constant |
| $X_L$ Long-spaced transmitter | Highest resistivity, lowest dielectric constant. |

Further with the present invention, fresh water invasion in a salt water formation and salt water invasion in a fresh water formation can easily be determined by the high dielectric constants associated with water as contrasted to oil. In the case of little or no invasion, data from each of the transmitters will be substantially the same.

The foregoing disclosure and description of the invention are illustrative and exemplary thereof, and various changes in the size, shape, materials, components, circuit elements, wiring connections and contacts, as well as in the details of the illustrated circuitry and construction may be made without departing from the spirit of the invention.

We claim:

1. A dielectric well logging apparatus for obtaining a plurality of amplitude ratios and phase differences between electromagnetic wave energy signals which have passed different distances through a subsurface formation adjecent a well borehole, so that an analyst may determine resistivity and dielectric constants for the different distances of travel through the formation comprising:
  (a) sonde means for moving through the well borehole;
  (b) at least three transmitter coils for emitting radio frequency energy into the formation at different depths in the borehole, said coils being spaced from each other in said sonde means for disposition at different depths in the borehole;
  (c) control means for controlling the activation of said transmitter coils;
  (d) a plurality of receiver coils for receiving energy from said transmitter coils after passage through the formation and borehole, said receiver coils being spaced from each other and from said transmitter coils in the sonde for disposition at different depths in the borehole;
  (e) said receiver coils forming in groups of two different transmitter-receiver pairs, differently spaced from the other transmitter receiver pairs, with each of said transmitter coils;
  (f) receiver circuit means for forming signals representing the electromagnetic wave energy received in said receiver coils; and
  (g) processing circuit means for forming output signals representative of the phase difference and amplitude ratio for each of said different transmitter-receiver pairs so that the analyst may determine the resistivity and dielectric constants for the different distances of travel to determine if fluid invasion is present in the formation.

2. The apparatus of claim 1, wherein said processing circuit means includes:
  means for separating the signals from said receiver circuit means into channels according to the particular one of said transmitter coils emitting the energy.

3. The apparatus of claim 1, further including:
  means for forming a visible record of the output of said processing circuit means.

4. The apparatus of claim 1, wherein said sonde is moved in the borehole by an electrically conductive wireline and further including:
  means for transmitting the signals from said receiver circuit means through said wireline to said processing circuit means.

5. The apparatus of claim 1, wherein said control means comprises:
  (a) means for generating command codes specifying which of said transmitter coils is to be emitting;
  (b) means for converting the command codes into a serial command stream; and
  (c) means for transmitting the serial command stream to said transmitter coils.

6. The apparatus of claim 5, further including transmitter circuit means in said sonde, comprising:
  (a) transmitter converter means for converting the serial command stream into command codes; and
  (b) means for driving said transmitter coils in response to the command codes.

7. The apparatus of claim 1, further including:
  means for optically coupling said control means and said transmitter coils.

8. The apparatus of claim 1, wherein said control means includes:
  means for forming a frequency-shift keyed signal.

9. The apparatus of claim 8, further including transmitter circuit means in said sonde, comprising:
  (a) transmitter converter means for converting the said command stream into command codes; and
  (b) means for driving said transmitter coils in response to the command codes.

10. The apparatus of claim 9, wherein said transmitter converter means comprises
  demodulator means in said transmitter circuit means for decoding the frequency-shift keyed signal.

11. The apparatus of claim 10, further including:
  means for optically coupling said demodulator means and said means for applying.

12. The apparatus of claim 1, wherein said control means includes:
  a time division multiplex generator of command codes for activating said transmitter coils in a timed sequence.

13. The apparatus of claim 12, wherein said processing circuit means includes:
  a time division demultiplexer responsive to the command codes of said control means for separating the signals from said receiver circuit means into channels according to the ones of said transmitter coils emitting the energy.

14. The apparatus of claim 12, further including transmitter activator means in said sonde including:
  a time division multiplexer responsive to the command codes of said control means for activating said transmitter coils in a timed sequence.

15. The apparatus of claim 1 wherein said receiver circuit means comprises:
  (a) local oscillator means for forming a reference frequency signal;
  (b) plural mixer means, one connected to each of said receiver coils, to form a product signal between the reference frequency signal and the output of said receiver connected therewith.

16. The apparatus of claim 15, further including:
  means for modulating the product signal from each of said plural mixer means onto a different frequency carrier signal.

17. The apparatus of claim 16, further including:
  means for combining the modulated carrier signals from said means for modulating.

18. The apparatus of claim 1, wherein each of said transmitter coils emits electromagnetic waves at a common frequency.

19. An apparatus for electromagnetic logging of a well borehole to obtain the resistivity and dielectric contant of the formation surrounding the borehole, said apparatus comprising:
  a logging tool adapted for lowering into the borehole and having at least five spaced coils disposed thereon for disposition at spaced positions from each other at different depths in the borehole;
  one coil being a transmitter coil and at least two others of said coils being receiver coils to form a first transmitter-receiver pair with a first spacing for transmitting and receiving electromagnetic wave energy signals;
  at least two additional ones of said coils forming second and third transmitter-receiver pairs with second and third spacings, different from each other and from said first spacing, for transmitting and receiving electromagnetic wave energy signals into the formation at different depths in the borehole;
  a power source having a frequency between twenty and sixty megahertz, said power source being coupled to said transmitter coil to provide electromagnetic wave energy thereto;

a phase measuring circuit, said phase measuring circuit forming for each of said three transmitter-receiver pairs a measure of the phase difference between the electromagnetic wave energy signals received therein;

a ratio measuring circuit for forming for each of said three transmitter-receiver pairs a measure of the amplitude ratio of the signals received from said transmitter coil of said transmitter-receiver pairs;

means for recording as a function of logging tool depth in the borehole the phase difference and the amplitude ratio measures formed in said phase measuring circuit and said ratio measuring circuit so that the analyst may determine the resistivity and dielectric constant for the different depths of the formation in the borehole.

20. The apparatus of claim 19, further including:
at least two additional of said coils being transmitter coils.

21. An apparatus for electromagnetic logging of a formation adjacent a well borehole to obtain amplitude ratio and phase difference readings for different distances of travel of electromagnetic wave energy through the formation so that an analyst may determine the resistivity and dielectric constants of the formation through the different distances and analyze the extent of fluid invasion of the formation, said apparatus comprising:

a logging tool adapted for lowering into the borehole and having at least five spaced coils disposed thereon for disposition at spaced positions from each other at different depths in the borehole;

one coil being a transmitter coil and at least two others of said coils being receiver coils to form a first transmitter-receiver pair with a first spacing for transmitting and receiving electromagnetic wave energy signals;

at least two additional ones of said coils forming second and third transmitter-receiver pairs with second and third spacings, different from each other and from said first spacing, for transmitting and receiving electromagnetic wave energy signals;

a phase measuring circuit, said phase measuring circuit forming for each of said first, second and third transmitter-receiver pairs a measure of the phase difference between the electromagnetic wave energy signals received therein;

a ratio measuring circuit for forming for each of said first, second and third transmitter-receiver pairs a measure of the amplitude ratio of the signals received from said transmitter coils of said transmitter-receiver pairs;

means for recording as a function of logging tool depth in the borehole each of the phase difference and the amplitude ratio measures formed in said phase measuring circuit and said ratio measuring circuit so that the analyst may determine from the resistivity and dielectric constants if fluid invasion is present in the formation.

22. An apparatus for electromagnetic logging of a well borehole to obtain the resistivity and dielectric contant of the formation surrounding the borehole, said apparatus comprising:

a logging tool adapted for lowering into the borehole and having at least five spaced coils disposed thereon for disposition at spaced positions from each other at different depths in the borehole;

at least one coil being a transmitter coil and at least two others of said coils being receiver coils to form a first transmitter-receiver pair with a first spacing for transmitting and receiving electromagnetic wave energy signals;

said at least five coils further being electrically connectable to form at least two other different transmitter-receiver pairs, at different spacings from other transmitter-receiver pairs, and being comprised of one transmitter coil and two receiver coils for transmitting and receiving electromagnetic wave energy;

a phase measuring circuit, said phase measuring circuit forming for each of said three transmitter-receiver pairs a measure of the phase difference between the electromagnetic wave energy signals received therein;

a ratio measuring circuit for forming for each of said three transmitter-receiver pairs a measure of the amplitude ratio of the signals received from said transmitter coil of said transmitter-receiver pairs;

means for recording as a function of logging tool depth in the borehole the phase difference and the amplitude ratio measures formed in said phase measuring circuit and said ratio measuring circuit so that the analyst may determine the resistivity and dielectric constant of the formation.

* * * * *